Figure 1:
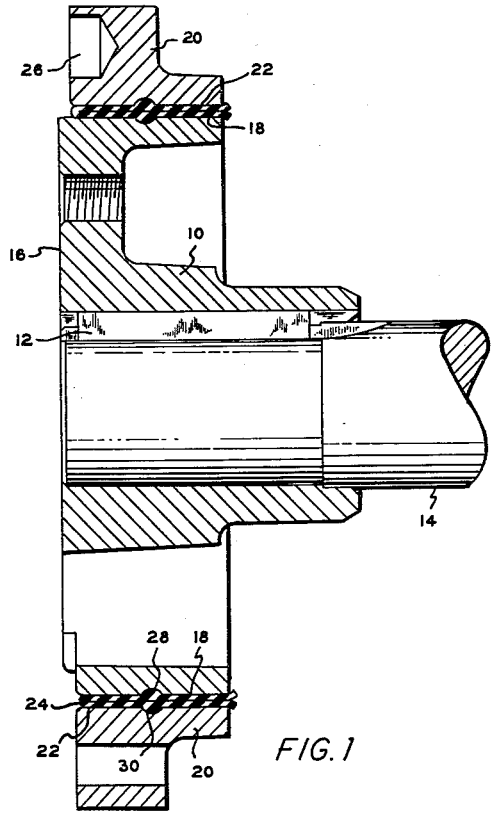

May 7, 1963 — H. P. ARNT, JR — 3,088,332
VIBRATION DAMPER
Filed Feb. 4, 1960

INVENTOR
HERALD P. ARNT JR.
BY
ATTORNEY

United States Patent Office 3,088,332
Patented May 7, 1963

3,088,332
VIBRATION DAMPER
Herald P. Arnt, Jr., Litchfield, Mich., assignor to Simpson Manufacturing Company, Litchfield, Mich.
Filed Feb. 4, 1960, Ser. No. 6,809
2 Claims. (Cl. 74—574)

The invention relates to vibration absorbing or dampening devices and particularly pertains to devices employed with rotating elements such as crankshafts and the like.

The vibrations produced in crankshafts are usually dampened by annular inertia members rotating concentrically about the crankshaft axis and affixed thereto through flexible connecting means. The flexible connecting means absorbs many of the vibration frequencies of the crankshaft and dissipates this energy in the form of heat. Rubber rings, bushings, and sleeves have been employed as the flexible connecting elements and a wide variation of means have been employed to maintain the flexible absorbing media in position between the metallic crankshaft or crankshaft mounted element and the inertia member.

One method of affixing an annular inertia member to an annular crankshaft hub has been to concentrically arrange the inertia member and hub and dimension the outer diameter of the hub substantially less than the inner diameter of the inertia member, whereby an annular clearance between the two parts is produced. An annular rubber ring is then forced into the clearance, whereby the rubber is placed under tension, primarily in an axial direction. The normal radial thickness of this ring is greater than the radial dimension of the clearance, whereby after the ring is tensioned and placed in the clearance the internal forces within the ring striving to return the ring to its normal size force the inner and outer surfaces of the ring into tight engagement with the hub and inertia member respectively maintaining an effective assembly of the ring, hub, and inertia member. A vibration dampener of this type is disclosed in the United States patents to F. C. Haushalter, Nos. 2,795,036 and 2,795,037.

While the above described method of assembly has proven fairly dependable, some difficulty has been experienced wherein the inertia member axially shifts with respect to the crankshaft hub due to axial movement between the inertia member and ring or ring and hub and should such shifting be sufficient to "throw" the inertia member, serious damage could result.

To prevent such axial shifting of the inertia member and also obtain a wider range of frequency absorption with dampeners of the above type, it is proposed by the invention to employ radially extending elements within either the inertia member, the crankshaft hub, or both, which receive portions of the tensioned rubber to simultaneously "key" the ring to the inertia member, hub, or both, to prevent relative axial displacement and also relieve stresses in the rubber at predetermined locations to widen and vary the frequency absorption response of the ring.

It is thus an object of the invention to provide a rotating vibration dampener construction wherein a pre-tensioned flexible vibration absorbing element is employed to affix an inertia member to the part to be dampened and means are provided to key the flexible member to these components by the natural expansion of the member after assembly of the dampener components.

Another object of the invention is to provide a vibration dampener construction having an annular inertia member maintained on a rotating vibrating member by a pre-tensioned flexible element interposed therebetween wherein annular radially extending recesses are defined in the surface of the inertia and vibrating members engaged by the flexible element, whereby the flexible element will occupy the recesses upon assembly of the dampener components to resist axial displacement of the components and the variation of the stresses and thickness of the flexible element produced by the recesses lowers the dampenable frequencies over constructions not employing recesses.

A further object of the invention is to produce a vibration dampener construction employing a pre-tensioned flexible element wherein means are employed to vary the tension within said element at predetermined locations to vary the vibration response of the dampener and in one embodiment such means also aids in cooling the flexible element.

Figure 2:
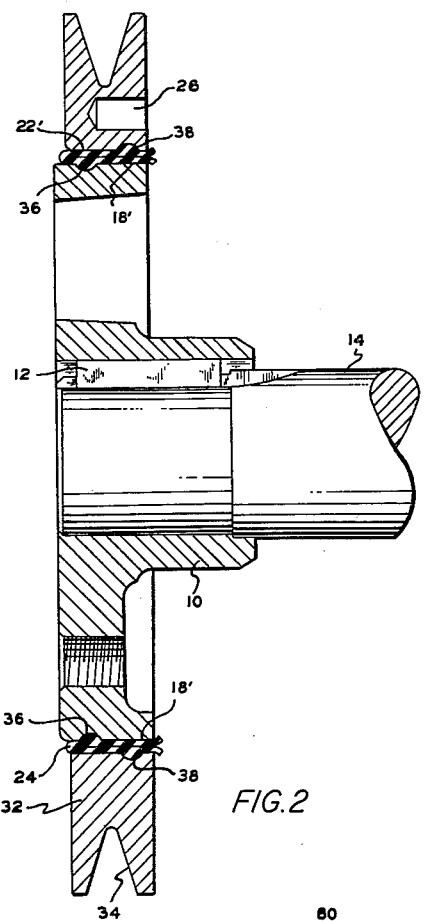
Figure 3:
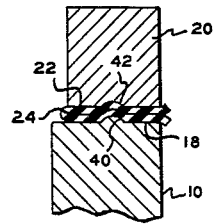
Figure 4:
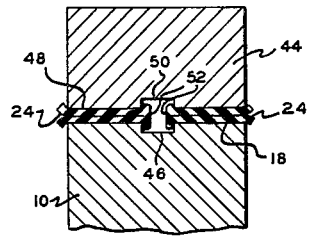
Figure 5:
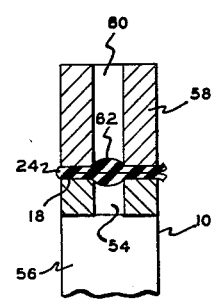

These and other objects of the invention will become apparent from the following description and accompanying drawings, wherein:

FIG. 1 is an elevational sectional view of a vibration dampener in accord with the invention, wherein annular recesses are formed in the hub and inertia members in opposed relation, FIG. 2 is an elevational sectional view of another common type of vibration damper arrangement wherein the inertia member also functions as a pulley showing a variation of recess location wherein the recesses of the inertia and hub members are relatively axially spaced, FIG. 3 is a sectional elevational view of another modification of the invention wherein an annular rib is formed on the hub opposed to a recess defined on the inertia member, FIG. 4 is a sectional elevational view of another embodiment of the invention for use with extraordinarily heavy or wide inertia members, and FIG. 5 is an elevational sectional view of another embodiment of the invention wherein the means permitting the flexible element to expand also aids in the cooling of the element.

While the principles of the invention may be employed in any circumstances wherein annular elements are affixed together by a pre-tensioned flexible member, the invention is particularly adapted to use with vibration dampeners of the type used with internal combustion engine crankshafts and other automotive rotating elements and, hence, will be described in this environment.

Referring to FIG. 1, one type of conventional vibration dampener takes the form of a hub 10 which is keyed at 12 onto the end of a crankshaft 14. Usually the hub 10 is located at the front of the engine and a pulley, not shown, is often concentrically bolted to the front face 16 concentric to the crankshaft axis to drive the engine fan, generator, and other auxiliary equipment. A cylindrical surface 18 defines the periphery of hub 10 and this surface is also concentric to the axis of shaft 14.

The inertia member 20 takes the form of an annular ring having an internal cylindrical surface 22 which is of substantially greater diametrical dimension than the diameter of surface 18. Therefore, upon superimposing the inertia ring 20 upon the surface 18, an annular gap or clearance between the two members is formed.

The third element of the vibration dampener assembly consists of an elastic annular ring 24, usually of rubber, which is maintained in intimate engagement with the surfaces 18 and 22, whereby the hub, ring, and inertia member become an assembled unit. As vibrations occur in crankshaft 14 and hub 10, the mass of the inertia member resists vibration in a like manner and the elastic ring 24 dampens and absorbs the vibrations and dissipates the absorbed energy in the form of heat. Holes 26 are often drilled in the inertia member to balance the dampener assembly.

While the elastic ring 24 is often cemented or bonded to the hub and inertia members, in the practice of the invention the ring 24 is pre-tensioned or stretched before being placed in position whereby the internal forces within the ring cause the ring to expand into forceful engagement with the surfaces 18 and 22 and thereby maintain the assembly of the hub, ring, and inertia member. It will be understood that the "free" or normal radial thickness of the ring 24 must be greater than the thickness of the annular clearance between the surfaces 18 and 22 to effect this type of assembly, for instance, an elastic ring 24 having a normal radial thickness of .2 of an inch may be axially stretched whereby the thickness is only .1 of an inch, and the ring is then placed in an annular clearance of .1 of an inch. Upon release of the force stretching the ring, the tendency for the ring to return to a thickness of .2 of an inch is prevented by surfaces 18 and 24, and the considerable internal forces within the ring attempting to return the ring to its normal shape and dimensions produce the connection.

Several means may be used to pre-tension ring 24 and the method disclosed by United States Patents Nos. 2,795,036 and 2,795,037 has been found acceptable for the purposes of the invention. It will be appreciated, however, that the ring 24 may be pre-tensioned by any suitable method and is not limited to the method of the above patents. In the method of the above patents, an elastic rubber ring is engaged by a very thin annulus which folds the rubber over upon itself and forces the ring into the clearance between surfaces 18 and 22. As the thickness of the gap is considerably less than the normal thickness of the double rubber layer, the insertion of the ring into the clearance places the material of the ring under tension whereby the inertia member, ring, and hub are maintained in assembled relation as described above. The annulus is then withdrawn and the connection is complete.

While this type of assembly performs satisfactorily in most instances, there have been occasions wherein the constant vibration causes relative axial movement of the elastic ring on the hub or the inertia member on the ring. This is a dangerous condition in that "throwing" of the rapidly rotating inertia member could seriously damage the vehicle and endanger the occupants. The cause of this "creeping" is not completely known; however, it seems to result from a combination of the internal stresses within the elastic ring and vibrations and harmonics acting upon the inertia member.

To prevent such axial displacement of the inertia member 20 on the hub 10, it is proposed to provide means upon the surfaces 18 and 22 which will cooperate with the elastic ring to resist axial movement of the ring or inertia member but will not adversely affect the vibration absorbing characteristics of the ring or the strength of the connection. In the embodiment of FIG. 1, these means take the form of an annular recess 28 of arcuate cross-section formed in the surface 18 and a similar recess 30 defined in the surface 22. These recesses are located in opposed relation and are of such dimension radially that the internal pressures and stresses within the elastic ring 24 causes the elastic material to completely fill the recesses. Thus, the elastic material within the recesses 28 and 30 functions as a "key" to resist axial movement of the elastic ring 24 relative to surfaces 18 or 22.

The increased cross-sectional area of the elastic ring 24 permitted by the recesses 28 and 30 will, of course, reduce the internal stress within the material in that region; however, as this area amounts to a fraction of the sectional area of the elastic ring, the connection between the hub 10 and inertia member 20 is not significantly weakened torquewise and yet the resistance to axial displacement is greatly improved.

The increased cross-sectional area of the elastic ring and reduction of internal stresses therein adjacent the recesses also changes the dampening characteristics of the ring over constructions wherein the recesses are not employed. The relieving of internal ring pressures widens the effective absorption range of the ring by lowering the frequency response range.

A different embodiment of the invention is disclosed in FIG. 2, wherein another common construction of vibration dampener is illustrated. Similar reference numerals are used to designate elements similar to those of FIG. 1. The inertia member 32 of FIG. 2 is also employed as a belt pulley and, hence, a groove 34 is formed in the outer periphery for this purpose. The hub 10 is provided with a cylindrical surface 18' having an annular recess 36 defined therein, and the inner cylindrical surface 22' of the inertia member 32 is formed with a recess 38. In this embodiment, the recesses 36 and 38 are axially offset relative to each other, whereby the internal pressures within the elastic ring 24' are not relieved to the degree of the recess arrangement of FIG. 1, yet the "keying" action of the rubber filling the recesses is equal to and possibly greater than the form of FIG. 1. As this modification produces two annular areas within the elastic ring of reduced stress or tension, this form also lowers the effective frequency dampening characteristics over non-recess constructions.

FIG. 3 shows another form for practicing the invention, wherein keying of the elastic ring to the hub and inertia member to resist axial displacement is accomplished without significantly varying the stress or internal pressure with the elastic material. In this embodiment, the hub surface 18 is provided with an annular rib or projection 40 which extends outwardly, and the surface 22 of the inertia member is formed with an annular recess 42 in opposed relation to the rib. Thus, by making the sectional areas of the rib 40 and recess 42 substantially the same, the area on the clearance between the hub 10 and inertia member 20 is approximately constant throughout its axial length and the tension pressures within the elastic member will be substantially constant.

FIG. 4 illustrates another embodiment employing the principles of the invention for use with inertia members of greater than normal mass or width, whereby a wide range of frequencies may be dampened. In this construction, the width of the inertia member 44 is too great to be supported by a single elastic ring as mechanical problems limit the width of ring which may be placed under pre-tension and forced into the annular clearance. Therefore, a wide inertia member is best mounted by inserting an elastic ring 24 into each end of the clearance between the hub 10 and inertia member 44. To lock the rings 24 into position, the central portion of the hub surface 18 is recessed at 46 in a rectangular configuration, and the surface 48 of inertia member 44 is likewise recessed at 50 in opposed relation to recess 46. When the elastic rings 24 are inserted into position, the folded end 52 is pushed a considerable degree into the void defined by recesses 46 and 50 whereby the elastic material of end 52 is sufficiently spaced from the radial edges of the recesses to expand into a "head" which engages the recesses radial edges and functions to key the rings to the hub and inertia member to resist axial displacement or creep of the inertia member. As the ends 52 are in opposed relation to each other, resistance is provided against axial movement of the inertia member in either direction.

The modification of FIG. 5 relates to a construction which both "keys" the elastic ring to the hub and inertia member and aids in dissipating the heat generated in the elastic ring during operation of the dampener. To this end, a plurality of radial holes 54 are drilled in the hub intersecting surface 18 and voids 56 which are usually formed into the hub 10 to reduce the weight thereof. The inertia member 58 is likewise formed with radial holes 60, which, during assembly, are preferably aligned with holes 54. Upon insertion of the elastic ring 24, the material will not be confined in the hole region and will thus expand to form a circular bulbous portion 62 as illustrated. As the portion 62 radially expands into the holes, an effective lock or key action is produced which resists axial displacement of the inertia member on the hub.

The cooling action of the elastic ring 24 is achieved through the circulation of air within the holes 54 and 60 due to the rapid rotation of the vibration damper, and as portions of the central regions of the elastic ring 24 are in direct contact with the air within the holes, a transfer of heat will take place.

Although the elastic rings of the described embodiments of the invention are shown to be of the type of United States Patents Nos. 2,795,036 and 2,795,037, the practice of the invention is not limited to this type ring and single layer pre-tensioned rings will benefit from the invention in a like manner. It will also be appreciated that many configurations of recesses may be employed without department from the spirit of the invention, the arcuate cross-section of the recesses of FIGS. 1 through 3 could be of rectangular form, for instance, and function in an effective manner.

I claim:

1. In a vibration dampener, a hub member having an axis of rotation and an outer surface concentric to said axis, an annular inertia member circumscribing said outer surface and having an inner surface concentric to, and radially spaced from, said outer surface, an elastic ring having a normal radial thickness greater than the radial thickness of the spacing between said hub and inertia members interposed between said outer and inner surfaces under tension maintaining said hub, ring and inertia members in assembled relation, said tension within said elastic ring being primarily in an axial direction with respect to said surfaces and an annular recess defined in each of said surfaces, said recesses each including opposed radially extending surface portions intersecting the associated surface and transversely related to the axis of said inner and outer surfaces, the width of said recesses being substantially less than the axial width of said inner and outer surfaces and ring, the radial depth of said recesses being sufficient to permit the portions of said ring axially aligned with said recesses to expand into said recesses substantially relieving the tension stresses in said ring portion within said recesses providing a keying portion placing the unrelieved ring portions in shear relation with the localized keying portions thereby resisting relative axial displacement of said ring, hub and inertia member.

2. In a vibration dampener as in claim 1, wherein the recess of said outer surface is located in axial opposed relation to the recess of said inner surface.

References Cited in the file of this patent

UNITED STATES PATENTS

| | | |
|---|---|---|
| 1,874,515 | Harris | Aug. 30, 1932 |
| 1,892,793 | Warner | Jan. 3, 1933 |
| 1,928,763 | Rosenberg | Oct. 3, 1933 |
| 2,779,211 | Henrich | Jan. 29, 1957 |
| 2,795,036 | Haushalter | June 11, 1957 |
| 2,795,037 | Haushalter | June 11, 1957 |
| 2,972,904 | Troyer | Feb. 28, 1961 |